United States Patent [19]

Socks et al.

[11] Patent Number: 5,583,526
[45] Date of Patent: Dec. 10, 1996

[54] HAND CALIBRATION SYSTEM FOR VIRTUAL REALITY VEHICLE SIMULATOR

[75] Inventors: Kenric P. Socks, Rochester Hills; Peter J. Daniels, Warren, both of Mich.

[73] Assignee: Chrysler Corporation, Auburn Hills, Mich.

[21] Appl. No.: 508,728

[22] Filed: Jul. 28, 1995

[51] Int. Cl.$^6$ .................................................. G09G 5/00
[52] U.S. Cl. ................................. 345/8; 345/7; 434/37; 434/38; 434/71
[58] Field of Search ........................... 345/7, 8; 359/630; 340/980; 434/37, 38, 71

[56] References Cited

U.S. PATENT DOCUMENTS

| | | | |
|---|---|---|---|
| 4,414,537 | 11/1983 | Grimes . | |
| 4,849,692 | 7/1989 | Blood | 324/208 |
| 4,930,888 | 6/1990 | Freisleben et al. | 356/152 |
| 4,945,305 | 7/1990 | Blood | 324/207 |
| 4,988,981 | 1/1991 | Zimmerman et al. | 340/709 |
| 5,185,561 | 2/1993 | Good et al. | 318/432 |
| 5,278,532 | 1/1994 | Hegg et al. | 345/7 |
| 5,320,538 | 6/1994 | Baum | 345/8 |
| 5,381,158 | 1/1995 | Takahara et al. | 345/156 |

Primary Examiner—Richard Hjerpe
Assistant Examiner—Juliana S. Kim
Attorney, Agent, or Firm—Margaret A. Dobrowitsky

[57] ABSTRACT

A virtual reality vehicle simulator has a seat for supporting a person in a sitting position. The person wears goggles that present to the person an image of a virtual vehicle, as well as a virtual image of the person's hand and any objects, such as coffee cups, that the person may grasp in his hand. A position sensing system senses the position of a marker that is attached to a marked portion of the person's hand, e.g., the back of the hand. The person may be tasked to manipulate a virtual object, e.g., a virtual pushbutton, with a contact portion of his hand, e.g., the index finger. To calibrate the distance between the marked and contact portions so that a virtual image of the hand accurately may be displayed, a control surface is positioned adjacent the seat such that the person can manipulate the control surface. Based on the manipulation, the distance between the marked and contact portions is determined, thus calibrating the size of the virtual hand to accurately model the person's actual hand.

13 Claims, 3 Drawing Sheets

HAND CALIBRATION SYSTEM FOR VIRTUAL REALITY VEHICLE SIMULATOR

FIELD OF INVENTION

The present invention relates generally to vehicle design systems, and more particularly to vehicle design systems which use virtual reality to model proposed designs.

BACKGROUND OF THE INVENTION

Evaluating the layout of proposed new vehicle interiors has heretofore been accomplished by forming full-scale models of the interiors out of wood, plastic, foam, or some other easily configurable material to permit, e.g., evaluation of the ergonomic aspects of the proposed new interiors, prior to building operational prototypes of the proposed designs. Specifically, proposed vehicle interior designs are simulated, i.e., "mocked up", and the response of test subjects who perform various simulated tasks in the mock-up are recorded and evaluated to assess, among other things, the ergonomic features of the simulated designs.

It will readily be appreciated that even minor changes in a proposed design may require significant and time-consuming modifications to a mock-up of a previous version of the design. Indeed, each new proposed design may require its own mock-up, thereby increasing the time, cost, and expense of evaluating many competing designs and thus undesirably limiting the number of proposed designs that can be evaluated.

Accordingly, as the present invention recognizes it is desirable to use modern computer technology to simulate, in virtual reality, proposed vehicle designs and thus provide a means for evaluating designs and making as many modifications to proposed designs as may be desired, without requiring time-consuming and expensive forming of a plethora of mock-ups. The system of the present invention, like many virtual reality systems, presents an image of a space (in this case, the vehicle) to a user, as the actual space would be viewed by a user located in a position analogous to the position of the "view" of the virtual space that is presented.

As further recognized by the present invention, it is desirable to evaluate the ergonomic design of a proposed vehicle with respect to accessibility of vehicle controls. For example, it might be desirable to evaluate the ease with which a person in the driver's seat of the vehicle can reach and push a knob on a radio. Or, it might be necessary to evaluate the ergonomic aspects of a person in the driver's seat grasping a shift knob of a vehicle or the steering wheel of the vehicle.

It will be appreciated that to permit such evaluations, the actual position of the person's hand accurately must be transformed to the virtual space and then projected to provide the same visual feedback to the person that the person would have were he sitting in an actual vehicle. Accurate projection is required to ensure that, for example, the image of a virtual index finger is not portrayed as extending even slightly into the surface of a virtual pushbutton when the user attempts to push the button. Such relatively inaccurate portrayal to the user of his virtual finger reduces the effectiveness of the simulation and, hence, the evaluation of the proposed design.

One way to ensure accurate projection of, e.g., the fingers of a person's hand in a virtual space is to dispose position sensors on the tip of each finger which transmit position signals to a receiver. One such system is disclosed in U.S. Pat. No. 5,381,158, which is directed to retrieving information stored in a database, not to virtual reality vehicle simulation. Unfortunately, the system disclosed in the '158 patent requires the user to wear a comparatively complex glove that is fitted with a number of position sensors. To comfortably accommodate differently-sized hands, which must be done to accommodate the many test subjects commonly required in new design evaluation, systems like the '158 invention inherently require the use of a plurality of differently-sized gloves.

Accordingly, as recognized by the present invention, it would be advantageous to provide a virtual reality system which accurately projects an image of a virtual hand, without requiring a complex system of sensors, and which is usable by differently-sized users without undue modification.

It is therefore an object of the present invention to provide a virtual reality simulation system which accurately projects an image of a person's hand as it would appear in virtual space. Another object of the present invention is to provide a virtual reality simulation system which accurately projects a virtual image of a person's hand, and which is of relatively simple construction. Still another object of the present invention is to provide a virtual reality simulation system which accurately projects a virtual image of a person's hand, and which is usable by differently-sized users without undue modification. Yet another object of the present invention is to provide a virtual reality simulation system which accurately projects a virtual image of a person's hand which is easy to use and cost-effective.

SUMMARY OF THE INVENTION

A simulation system presents to a person an image of a virtual space, including a portion of the person's body as it would appear to the person were the person present in the virtual space. The system includes a position marker which is positionable on a first portion of the person's body, and a position system is disposed for sensing the position of the marker. In accordance with the present invention, the position system generates a position signal that represents the position of the marker.

Furthermore, a calibration element is positioned at a fixed location in the system, with the calibration element being manipulable by a second portion of the person's body which is distanced from the first portion. When manipulated, the calibration element generates a timing signal. A computer is in communication with the position system and that calibration element for receiving the position and timing signals. Using the timing signals, the computer determines the distance between the first and second portions of the body, and then generates an image signal representative of the first and second portions of the person's body in the virtual space.

Preferably, the system also includes a visual display element in communication with the computer for displaying a two- or three-dimensional image representative of the virtual space. In the presently preferred embodiment, the virtual space simulates the interior of a vehicle, and the visual display element includes goggles. Per the present invention, the calibration element includes at least one manually manipulable member selected from the group consisting of: pushbuttons, finger-tip grasp surfaces, palm grasp members.

In another aspect of the present invention, a computer program device is disclosed. This aspect of the invention concerns a computer-generated vehicle simulation, and is realized in a critical machine component that causes a digital processing apparatus to perform method steps for displaying an image of a virtual space. Hereinafter, the machine component is referred to as a "computer program product".

In accordance with the present invention, the method steps include receiving a signal from a position system which represents the position of a movable position element. As envisioned by the present invention, the movable position element is associated with a reference object that is juxtaposed with the movable position element. The method steps also include receiving a signal from a positionally fixed timing element when the timing element is manipulated by a manipulating object that is spaced from the reference object by a distance $\delta$. Moreover, the method steps include determining the distance $\delta$ in response to the received signals, and then presenting an image of the virtual space including the reference object and the manipulating object such that the manipulating object appears to be spaced the distance $\delta$ from the reference object.

In still another aspect, a vehicle simulator includes a seat for supporting a person in a sitting position. Also, a calibration system includes a control surface which is positioned adjacent the seat such that a person sitting in the seat can manipulate the control surface with a marked portion of a hand. When the control surface is manipulated, the calibration system generates a timing signal for establishing the position in actual space of the marked portion of the hand.

In addition, a hand position sensing system includes a position marker that is attached to a contact portion of the hand, with the contact portion being spaced from the marked portion by a distance $\delta$. The hand position sensing system generates a position signal representative of the position of the marker in actual space. A virtual reality display system then receives the timing and position signals and generates a virtual image of the hand in response thereto, such that the marked portion of the hand appears in the virtual image to be spaced the distance $\delta$ from the contact portion of the hand.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
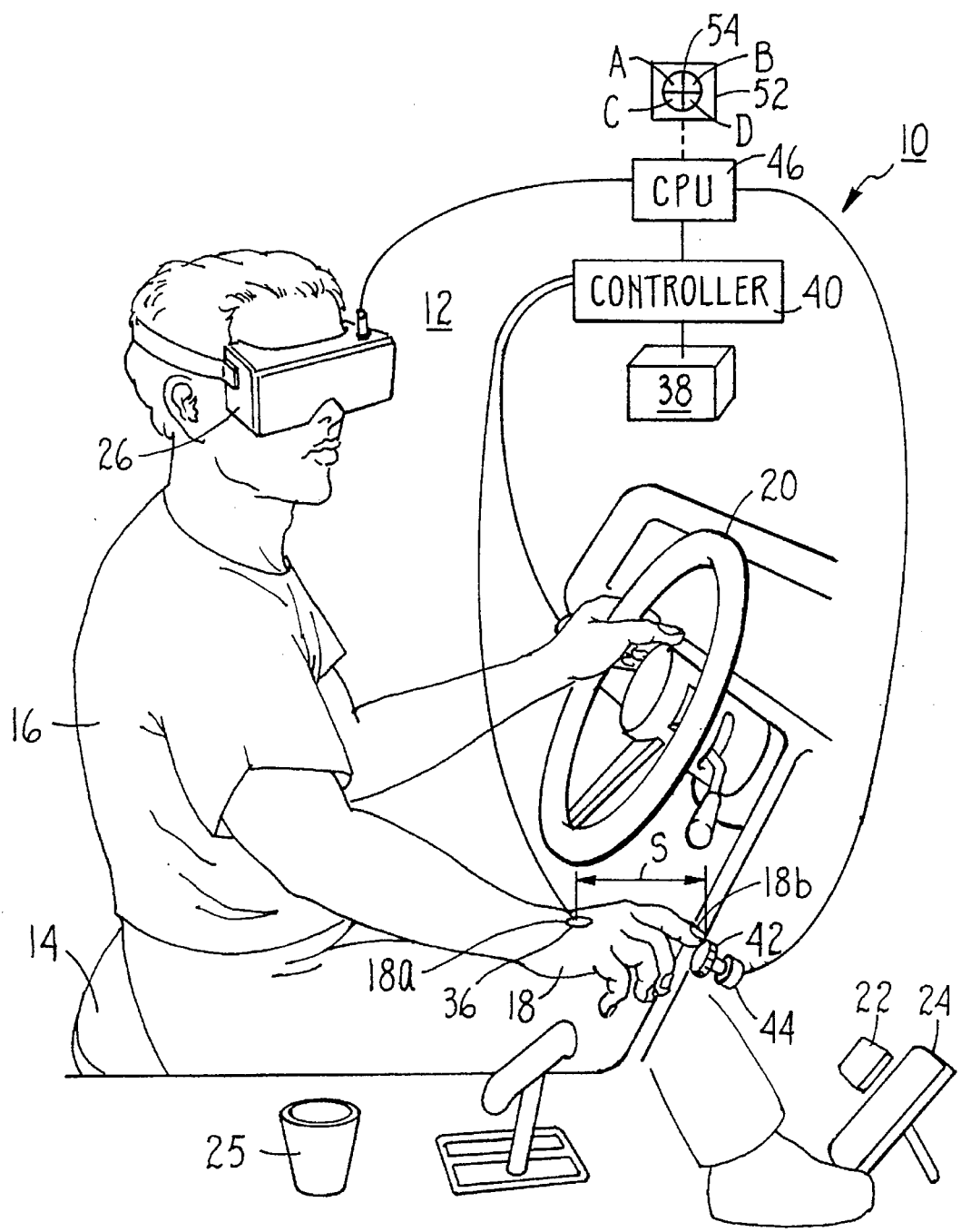
FIG. 1 is a perspective view of the hand calibration system of the present invention, showing a pushbutton control surface.

Referring initially to FIG. 1, a virtual reality vehicle simulator is shown, generally designated 10. As shown, the system 10 includes an actual space 12 and a seat 14 mounted in the space 12. A person 16 having a hand 18 can sit on the seat 14 and grasp an actual steering wheel 20 that is rotatably mounted in the space 12. Also, the person 16 can depress actual brake and accelerator pedals 22, 24 that are movably mounted in the space 12. Moreover, the person 16 can grasp a beverage container, such as a coffee cup 25 that is disposed in the space 12. Thus, the simulator 10 in one presently preferred embodiment is a vehicle simulator having several actual yet relatively simple components.

As shown in FIG. 1, the person 16 can view a visual display element, such as goggles 26 which are worn by the person 16. In accordance with the present invention, the goggles 26 are suitable virtual reality goggles known in the art which include left and right two- or three-dimensional visual display screens which respectively present to the person's left and right eyes a virtual image of the actual space 12.

It is to be understood that the virtual image of the space 12 includes images of the actual components in the space 12, as the components would actually be seen by a person sitting in the seat 14. Also, the virtual image of the space 12 that is presented by the goggles 26 includes images of simulated objects that are in the virtual space but not in the actual space, as the objects are intended to be seen by a person sitting in the seat 14 were the objects actually present at their simulated location in the space 12.

Figure 2:
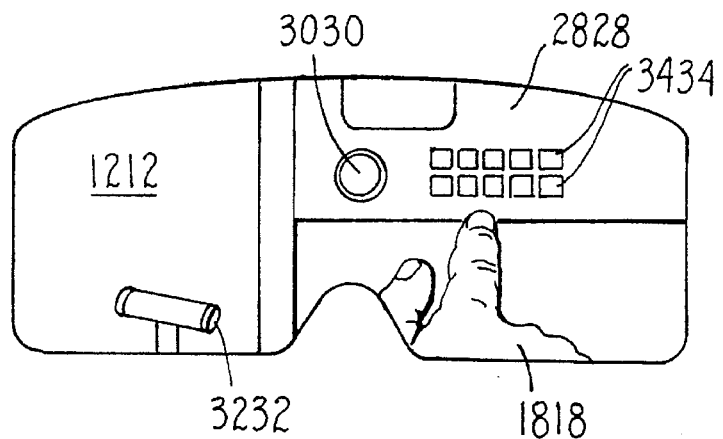
FIG. 2 is a perspective view of a virtual image of the interior of a vehicle, as would be seen by a person sitting in the simulator shown in FIG. 1.

For example, as shown in FIG. 2 a virtual image 1212 of the actual space 12 may depict a virtual radio 2828 having a rotatable on-off switch 3030. Moreover, the image of the virtual space 1212 may depict a virtual shift lever 3232, and a plurality of virtual radio pushbuttons 3434. Additionally, the image of the virtual space 1212 presents an image of a virtual hand 1818 that is located relative to the virtual space 1212 analogously to where the actual hand 18 is located relative to the actual space 12. In accordance with vehicle simulation, the person 16 can attempt to manipulate one or more of the virtual objects shown on the goggles 26, and in so doing, observe the image of his virtual hand 1818 as more fully discussed below.

Referring back to FIG. 1, a magnetically-responsive position marker 36 is affixed to a marked portion 18a of the person's hand 18. In the presently preferred embodiment, the marker 36 is fastened to the back of the person's hand 18 by elastic, Velcro®, tape, or a combination thereof. The marker 36 is shown to be in communication with a fixed transmitter 38, and the transmitter 38 and marker 36 are electrically connected to a controller 40 of a position sensing system.

In the presently preferred embodiment, the position sensing system, including the marker 36 and fixed transmitter 38, is the system marketed under the trade name "Flock of Birds" by Ascension Technologies Corp. of Burlington, Vt. accordance with this invention, the controller 40 of the position sensing system generates a position signal that is representative of the position in three-dimensional space of the marker 36 relative to the fixed transmitter 38.

Stated differently, the position signal represents the position of a movable position element, such as the marker 36. As intended herein, the movable position element is associated with a reference object, such as the marked portion 18a of the hand 18, and the movable position element and reference object are juxtaposed. It is to be understood that the marked portion 18a can be the back of the hand, as shown, or another part of the hand, provided that the movable position element is not moved from the marked portion after the calibration process described below.

Additionally, as shown in FIG. 1 the person 16 can manipulate, with a contact portion 18b of his hand 18, a control surface 42 of a calibration element 44. In the embodiment shown, the calibration element 44 is configured as a pushbutton, and is affixed to a predetermined location in the actual space 12.

Per the present invention, the calibration element 44 generates a timing signal when the person 16 manipulates the control surface 42. Thus, the calibration element 44 establishes a timing element which is manipulated by a manipulating object, such as the contact portion 18b, with the manipulating object being spaced from the reference object established by the marked portion 18a by a distance δ as shown.

The calibration element 44 and goggles 26 are electrically connected to a computer 46, as shown, as is the controller 40. Thus, it may now be appreciated that both the timing signal from the calibration element 44 and the position signal from the controller 40 are sent to the computer 46.

Figure 3:
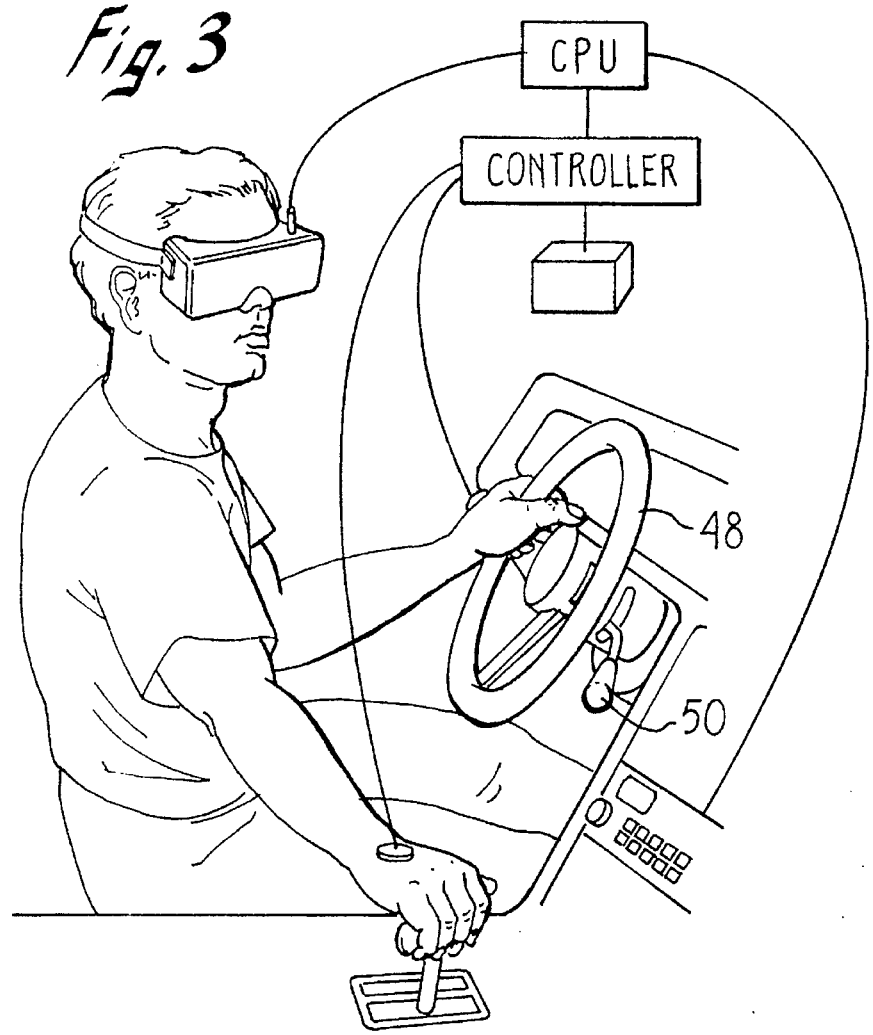
FIG. 3 is a perspective view of alternate embodiments of the control surface, shown configured as a steering wheel and as a rotatable radio knob, with portions shown in phantom.

In the embodiment shown in FIG. 1, the contact portion 18b is the tip of the person's index finger, and the control surface 42 of the calibration element 44 is a pushbutton. It is to be understood, however, that the contact portion of the person's hand might be something other than the index finger. For example, referring briefly to FIG. 3, a first control surface 48 is configured as a palm grasp surface, and more particularly as a steering wheel, and the contact portion of the person's hand accordingly is the palm of the hand. On the other hand, in FIG. 3 a second control surface 50 is configured as a finger tip grasp surface, e.g., a turn indicator lever, and the contact portion of the person's hand accordingly is an end segment of one of the fingers that grasps the lever to manipulate it. Further, as intended by the present invention, a calibration element can represent a coffee cup, so that a person can sit in the actual space and grasp the actual coffee cup 25, and observe a virtual image of his hand grasping a virtual coffee cup on the goggles 26. In any case, the calibration element of the present invention generates a timing signal when its associated control surface is manipulated, and then sends the signal to the computer 46.

As more fully disclosed below, the computer 46 includes a hand display module that may reside, for example, in RAM of the computer 46. Alternatively, the hand display module may be contained on a data storage device with a computer readable medium, such as a computer diskette 52 schematically shown in FIG. 1. Or, hand display module may be stored on a DASD array, magnetic tape, conventional hard disk drive, electronic read-only memory, optical storage device, or other appropriate data storage device. In an illustrative embodiment of the invention, computer-executable instructions related to the hand display module may be lines of compiled C++ language code.

Figure 4:
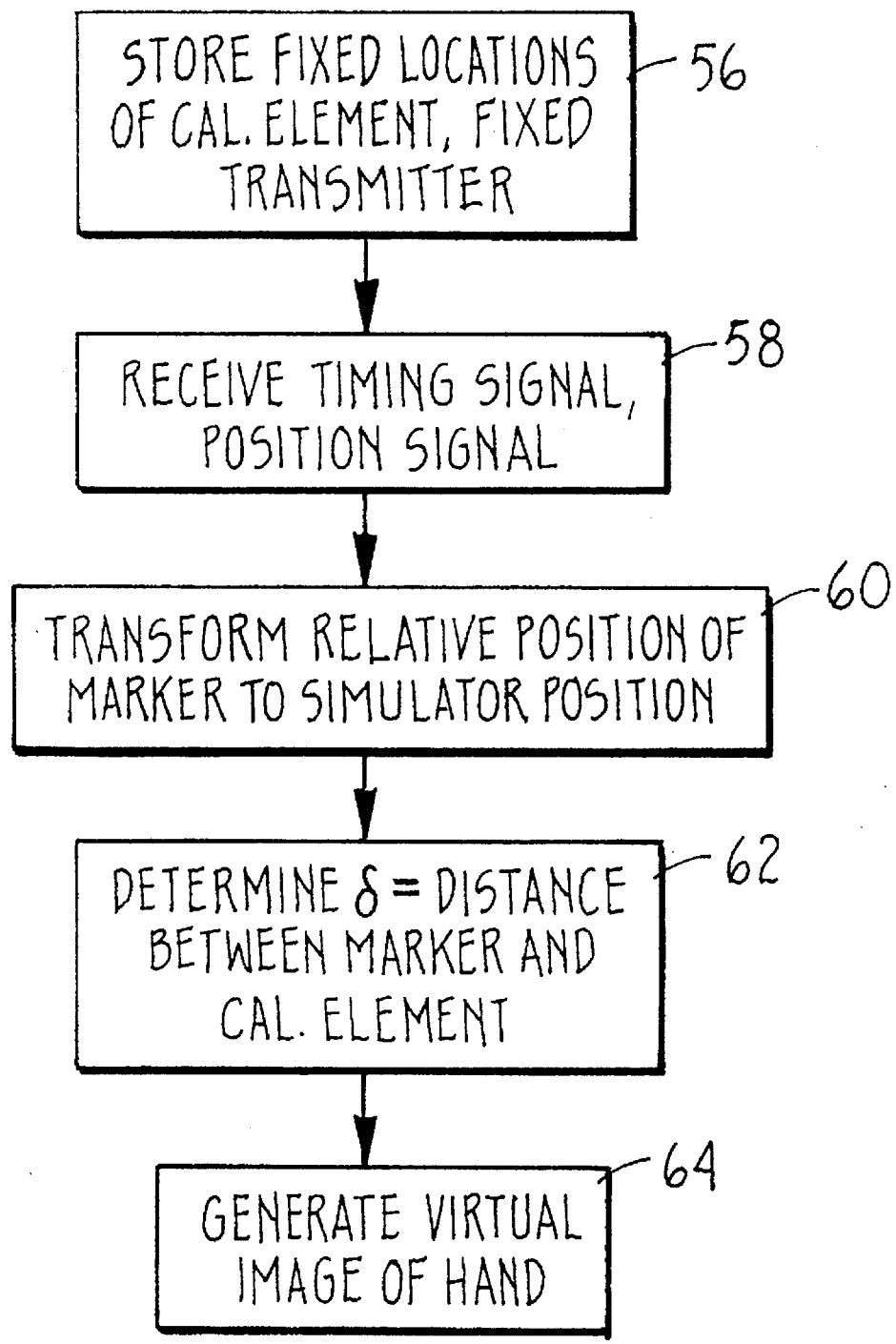
FIG. 4 is a flow chart of the operational steps of the present invention.

FIG. 4 illustrates the structure of the hand display module of the present invention as embodied in computer program software. Those skilled in the art will appreciate that FIG. 4 illustrates the structures of computer program code elements that function according to this invention. Manifestly, the invention is practiced in its essential embodiment by a machine component that renders the computer program code elements in a form that instructs a digital processing apparatus (that is, a computer) to perform a sequence of function steps corresponding to those shown in the figures. The machine component is shown in FIG. 1 as a combination of program code elements A-E in computer readable form that are embodied in a computer-usable data medium 54, on the computer diskette 52. As mentioned above, however, such media can also be found in semiconductor devices, on magnetic tape, and on optical disks.

Now referring to FIG. 4 to understand the operation of the hand display module of the present invention in accurately displaying a virtual image 18' of the hand 18, at block 56 the computer 46 stores the coordinates of the calibration element 44 and the fixed transmitter 38 relative to the actual space 12. For illustration, the coordinates are expressed in Cartesian terms, but it is to be understood that the coordinates could be expressed in polar or spherical terms.

Next, at block 58, the computer 46 receives the timing signal from the calibration element 44 and the position signal from the controller 40. The skilled artisan will appreciate that the arrival of the timing signal indicates that the contact portion 18b of the person's hand 18 is co-located with the calibration element 44.

When the timing signal is received, the computer 46 determines, based on the current position signal from the controller 40, the position of the marker 36 (and, hence, the position of the marked portion 18a of the hand 18) in the actual space 12. Recall that the position signal represents the relative position of the marker 36, i.e., the position of the marker 36 relative the fixed transmitter 38. Accordingly, at block 60 the computer 46 transforms the relative position of the marker 36 to the simulator 10 coordinate system by scaling the relative position as appropriate and then algebraically adding the relative position to the coordinates of the fixed transmitter 38 that were stored at block 56.

Next, at block 62, the computer 46 determines the distance δ between the marker 36 and calibration element 44. This distance δ equals the distance between the marked and contact portions 18a, 18b of the hand 18. Per the present invention, the computer 46 determines the distance δ as follows:

$\delta = (\Delta x^2 + \Delta y^2 \Delta z^2)^{1/2}$, where $\Delta x$ is the difference between the x coordinates of the marker 36 and the calibration element 44, $\Delta y$ is the difference between the y coordinates of the marker 36 and the calibration element 44, and $\Delta z$ is the difference between the z coordinates of the marker 36 and the calibration element 44.

From block 62, the computer 46 moves to block 64 to generate an image of the virtual hand 1818 (FIG. 2). To do this, the computer 46 presents an image of a hand configured, in the example shown, as pointing with the index finger and positioned at the coordinates of the marker 36 with the tip of the virtual index finger appearing to be spaced from the marked portion of the virtual hand by a distance δ.

It is to be understood that for other embodiments, the image of the virtual hand presented on the goggles 26 will conform to the particular task being undertaken by the person 16 within the simulator 10. For example, in the embodiment shown in FIG. 3, assuming that the person's task is to operate the turn indicator lever, the virtual hand will be configured with fingers extended together, as though for grasping a turn indicator lever, with the distance between the marked portion of the hand and the contact portion of the hand being accurately presented using the principles disclosed above. Or, when the person's task is to move a coffee cup in the space 12, a virtual hand holding a virtual coffee cup will be presented, with the distance between the marked portion of the hand and the contact portion of the hand being accurately presented using the principles disclosed above. Indeed, virtually any fixed gesture of a person's body can be accurately presented. Thus, those skilled in the art will now recognize that only a single marker 36 need be used to accurately (for the purposes of the present invention) depict any one of a number of virtual hand gestures, regardless of the particular physical characteristics of the person 16.

While the particular HAND CALIBRATION SYSTEM FOR VIRTUAL REALITY VEHICLE SIMULATOR as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

I claim:

1. A system for presenting to a person an image of a virtual space, including a portion of the person's body as it would appear to the person were the person present in the virtual space, comprising:

a position marker positionable on a first portion of the person's body;

a position system disposed for sensing the position of the marker, the position system generating a position signal representative of the position of the marker;

a calibration element positioned at a fixed location in the system, the calibration element being manipulable by a second portion of the person's body distanced from the first portion, the calibration element generating a timing signal when the calibration element is manipulated; and a computer in communication with the position system and calibration element for respectively receiving the position signal and timing signal therefrom and determining the distance between the first and second portions of the body in response thereto, whereby the computer generates an image signal representative of the first and second portions of the person's body in the virtual space.

2. The system of claim 1, further comprising a visual display element in communication with the computer for displaying an image representative of the virtual space, wherein the virtual space simulates a vehicle.

3. The system of claim 2, wherein the visual display element includes goggles.

4. The system of claim 2, wherein the visual display element projects a three-dimensional image of the virtual space.

5. The system of claim 2, wherein the calibration element includes at least one manually manipulable member selected from the group consisting of: pushbuttons, finger-tip grasp surfaces, palm grasp members, beverage containers.

6. A computer program device comprising:

a computer program storage device readable by a digital processing apparatus; and a program means on the program storage device and including instructions executable by the digital processing apparatus for performing method steps for displaying an image of a virtual space, the method steps comprising:

(a) receiving a signal from a position system representative of the position of a movable position element, the movable position element being associated with a reference object juxtaposed with the movable position element;

(b) receiving a signal from a positionally fixed timing element when the timing element is manipulated by a manipulating object spaced from the reference object by a distance $\delta$;

(c) determining the distance $\delta$ in response to the received signals; and (d) presenting an image of the virtual space including the reference object and the manipulating object such that the manipulating object appears to be spaced the distance $\delta$ from the reference object.

7. The program device of claim 6, wherein the virtual space simulates a vehicle, and the presenting step comprises presenting a three-dimensional image of the virtual space.

8. A vehicle simulator, comprising:

a seat for supporting a person in a sitting position;

a calibration system including a control surface positioned adjacent the seat such that a person sitting in the seat can manipulate the control surface with a marked portion of a hand, the calibration system generating a timing signal when the control surface is manipulated for establishing the position in actual space of the marked portion of the hand;

a hand position sensing system including a position marker attached to a contact portion of the hand that is spaced from the marked portion by a distance $\delta$, the hand position sensing system generating a position signal representative of the position of the marker in actual space; and a virtual reality display system for receiving the timing and position signals and generating a virtual image of the hand in response thereto, such that the marked portion of the hand appears in the virtual image to be spaced the distance $\delta$ from the contact portion of the hand.

9. The simulator of claim 8, wherein the virtual image includes a plurality of virtual objects not present in actual space.

10. The simulator of claim 9, wherein the virtual objects include a vehicle dashboard.

11. The simulator of claim 10, wherein the virtual reality display system includes a visual display element for displaying the virtual image, wherein the virtual image simulates the interior of a vehicle.

12. The simulator of claim 11, wherein the visual display element includes goggles.

13. The simulator of claim 12, wherein the control surface is selected from the group consisting of: pushbuttons, finger-tip grasp surfaces, palm grasp members, beverage containers.

* * * * *